Figure 1:
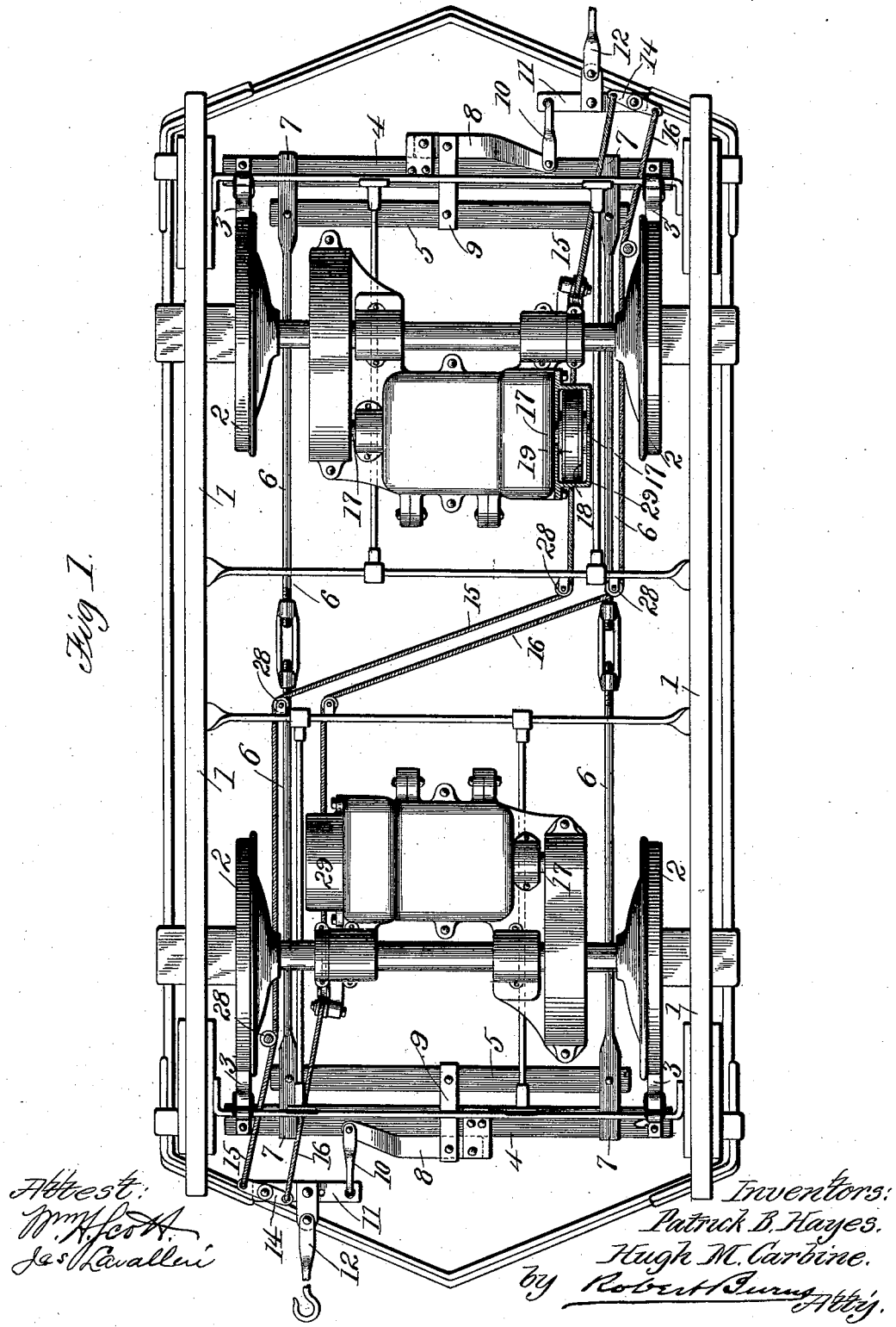

(No Model.) 2 Sheets—Sheet 1.

P. B. HAYES & H. M. CARBINE.
BRAKE FOR ELECTRIC MOTOR CARS.

No. 601,206. Patented Mar. 22, 1898.

Attest:
Wm H Scott
Jas V Cavalleri

Inventors:
Patrick B. Hayes.
Hugh M. Carbine.
by Robert Burns Atty.

(No Model.) 2 Sheets—Sheet 2.
P. B. HAYES & H. M. CARBINE.
BRAKE FOR ELECTRIC MOTOR CARS.
No. 601,206. Patented Mar. 22, 1898.
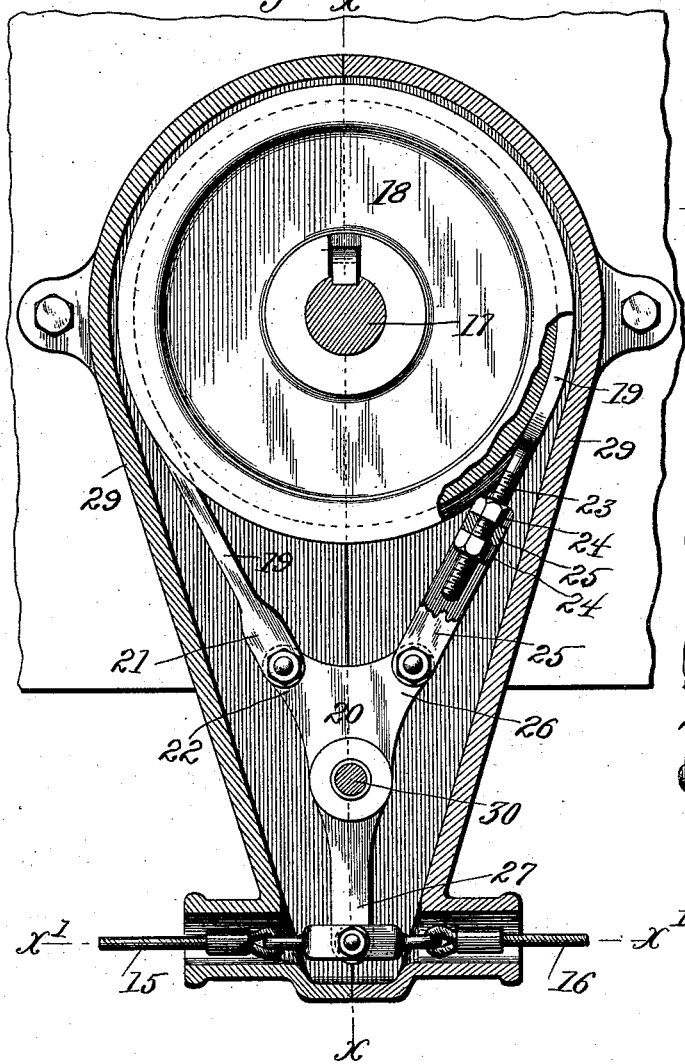
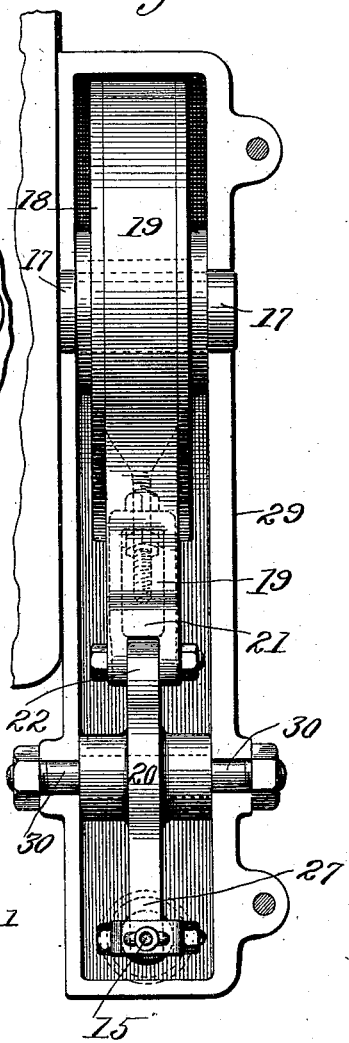
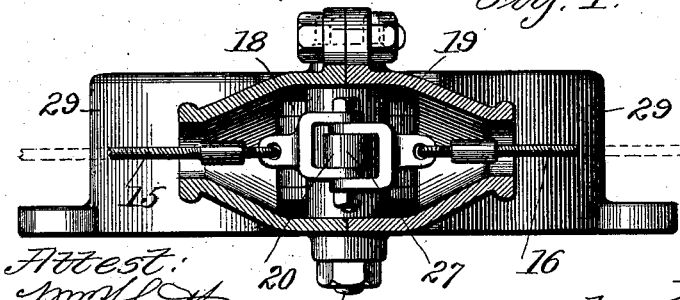
Inventors:
Patrick B. Hayes.
Hugh M. Carbine.
By Robert Burns
Atty.
Attest:
Wm. H. Scott
Jas. Lavallew

UNITED STATES PATENT OFFICE.

PATRICK B. HAYES AND HUGH M. CARBINE, OF CHICAGO, ILLINOIS.

BRAKE FOR ELECTRIC-MOTOR CARS.

SPECIFICATION forming part of Letters Patent No. 601,206, dated March 22, 1898.

Application filed December 23, 1896. Serial No. 616,802. (No model.)

*To all whom it may concern:*

Be it known that we, PATRICK B. HAYES and HUGH M. CARBINE, citizens of the United States, and residents of Chicago, in the county of Cook and State of Illinois, have invented certain new and useful Improvements in Brakes for Electric-Motor Cars; and we do hereby declare the following to be a full, clear, and exact description of the same, reference being had to the accompanying drawings, forming a part of this specification.

The present invention relates to a manually-operated mechanism for electric-motor cars, the objects of the present improvements being to provide a simple and effective arrangement of parts whereby the momentum of the armature-shaft of the motor is independently checked or braked in stopping the car and which mechanism is adapted to operate in unison with the usual wheel-brake mechanism and be operated in common therewith by the manually-actuated brake-operating mechanisms at the ends of the car, all as will hereinafter more fully appear and be more particularly pointed out in the claims. We attain such objects by the construction and arrangement of parts illustrated in the accompanying drawings, in which—

Figure 1 is a general plan view illustrating the application of the present invention to the motor-truck of a street-car; Fig. 2, an enlarged detail longitudinal sectional elevation at line $x\,x$, Figs. 1 and 3, illustrating the armature-brake mechanism of the present invention; Fig. 3, an enlarged detail transverse sectional elevation at line $x'\,x'$, Fig. 2; Fig. 4, a detail horizontal section of same at line $x^2\,x^2$, Fig. 2.

Similar numerals of reference indicate like parts in the several views.

Referring to the drawings, 1 represents the motor-truck frame; 2, the truck or car wheels, suitably supported in the frame; 3, the brake-shoes for the wheel, carried by the usual brake-beams 4, suspended, as usual, from the car-truck; 5, the usual counterpart equalizing-bars, connected together by longitudinally-adjustable connecting-rods 6, that have at each end stirrups 7, by which the respective equalizing-bars 5 are loosely connected to their respective brake-beams 4. 8 are counterpart brake-levers fulcrumed to the respective brake-beams 4 near the mid-length of such beams and having link connections 9 with the respective equalizing-bars 5, as shown, the longer and free ends of said levers 8 being connected to pull-rods 10.

The construction so far described is common in street-car brake mechanisms.

In the present invention 11 are equalizing-levers at the respective ends of the car, the middle portions of which have pivotal connections with the pull rods or chains 12, that in turn have operative connection in the usual hand-brake shafts 13 at the respective platforms of the cars and which are, as usual, adapted to be operated by the motorman or driver. At one end each equalizing-lever 11 is pivotally connected with its pull-rod 10, heretofore described, of the wheel-brake mechanism. At the other end each of such equalizing-levers 11 carries a supplementary equalizing-lever 14, having pivotal connection at its center with the aforesaid end of the main equalizing-lever 11, while the respective ends of this supplementary lever are connected to pull-cords or other flexible connections 15 and 16, that in turn have operative connections with brake mechanisms on the armature-shafts 17 of the respective electric motors of the truck. Such armature-shaft brake mechanisms each comprise the following parts:

18 is a flanged friction-drum fixed on a projecting end of the armature-shaft 17 of the motor-armature. 19 is a friction-band encircling said friction-drum and having its respective ends connected in the following manner to a pivoted T-shaped lever 20.

21 is a pivot-eye formation at one end of the band, through which passes a pivot bolt or pin to pivotally secure such end of the friction-band to one arm 22 of the T-shaped lever 20. 23 is a screw-threaded extension on the opposite end of the friction-band, that engages in an adjustable manner by means of adjusting-nuts 24 the stirrup 25, that in turn is pivotally connected to an opposite arm 26 of the T-shaped lever 20 by a suitable pivot bolt or pin, as shown in Figs. 2 and 3.

27 is the operating-arm of the T-shaped lever 20, arranged at substantially right angles to the arms 22 26, above described, of said lever. The lower end of this arm 27 has shackle connections with the pull-cords or flexible connections 15 and 16, heretofore described, and which pull-cords or flexible connections are in the construction shown in drawings arranged as follows:

The pull-cord 15 at one end of the car extends from its end of its supplementary equalizing-lever 14 in a direct manner to the operating T-shaped lever 20 of the armature-shaft brake mechanism for the electric motor at such end of the car, while the other or companion pull-cord 16 extends to the operating T-shaped lever of the armature-shaft brake mechanism for the electric motor at the other end of the car in an indirect manner, passing around guide pulleys or sheaves 28 to reach the same, as illustrated in Figs. 1 and 2 of the drawings.

The friction-brake bands 19 will be of any usual and suitable construction and may have, when so desired, detachable wearing-facings, of leather or other like material, as usual in similar friction-brake constructions.

29 are sectional inclosing casings of any usual construction that inclose the respective armature-shaft brake mechanisms to protect the same from dirt, dust, &c., and which in the present invention will usually afford means for supporting the pivot pins or bolts 30 for the T-shaped operating-levers 20 of said mechanisms.

With the present invention applied to a single motor-car truck instead of to a duplicate-motor truck, as illustrated in the drawings, some simplification will be made, to wit: The auxiliary equalizing-levers 14 will be omitted and the main equalizing-levers 11 will be connected directly to the respective pull-cords or flexible connections 15 and 16 of the single armature-shaft brake mechanisms of the car-motor.

With the present invention superior means are afforded for stopping the car in a very rapid manner without undue strain or load on any part of the brake mechanism, &c., in that the normal functions of the wheel-brake mechanism to stop the rotation of the car-wheels is very materially aided by the secondary armature-shaft brake mechanism operating in unison therewith to independently check the momentum or speed of the armature and thus remove a corresponding amount of duty from the wheel-brake mechanism, leaving the same free to perform its normal duty of stopping the rotation of the car-wheels.

Having thus fully described our said invention, what we claim as new, and desire to secure by Letters Patent, is—

1. In a motor-truck brake mechanism, the combination of a wheel-brake mechanism, an auxiliary brake mechanism for the armature-shaft of the motor, and an equalizing-lever 11, operated from the car-platform and having operative connection with the wheel-brake mechanism and the armature-shaft brake mechanism, substantially as set forth.

2. In a motor-truck brake mechanism, the combination of a wheel-brake mechanism, an auxiliary brake mechanism for the armature-shaft of the motor, and an equalizing-lever 11, operated from the car-platform, with one end connected to the wheel-brake mechanism, the aforesaid armature-shaft brake mechanism comprising a friction-drum on the armature-shaft, a brake-band encircling said drum, a T-shaped lever having connections with the ends of said band, and a flexible pull connection between the T-shaped lever and one end of the equalizing-lever 11, substantially as set forth.

3. In a motor-truck brake mechanism, the combination of a wheel-brake mechanism, an auxiliary brake mechanism for the armature-shaft of the motor, and a pair of equalizing-levers 11, arranged at opposite ends of the truck and operated from the car-platforms, such equalizing-levers having operative connection with the wheel-brake mechanism and the armature-shaft brake mechanism, substantially as set forth.

4. In a motor-truck brake mechanism, the combination of a wheel-brake mechanism, an auxiliary brake mechanism for the armature-shaft of the motor, and a pair of equalizing-levers 11, arranged at opposite ends of the truck and operated from the car-platforms, with one end connected to the wheel-brake mechanism, the aforesaid armature-shaft brake mechanism comprising a friction-drum on the armature-shaft, a brake-band encircling said drum, a T-shaped lever having connections with the ends of said band, and flexible pull connections between the T-shaped lever and the respective equalizing-levers 11, substantially as set forth.

5. In a brake mechanism for motor-trucks having duplicate motors, the combination of a wheel-brake mechanism, duplicate auxiliary brake mechanisms for the armature-shafts of the motors, and a pair of equalizing-levers 11, arranged at opposite ends of the truck and operated from the car-platforms, such equalizing-levers having operative connection with the wheel-brake mechanism, and with the armature-shaft brake mechanisms, substantially as set forth.

6. In a brake mechanism for motor-trucks having duplicate motors, the combination of a wheel-brake mechanism, duplicate auxiliary brake mechanisms for the armature-shafts of the motors, and a pair of equalizing-levers 11, arranged at opposite ends of the truck and operated from the car-platforms, with one end connected to the wheel-brake mechanism, the aforesaid armature-shaft brake mechanisms, comprising friction-drums on the armature-shafts, brake-bands encircling said drums, T-shaped levers having connections with the ends of said bands, and flexible pull connections between said T-shaped levers and the respective equalizing-levers 11, substantially as set forth.

In testimony whereof witness our hands this 19th day of December, 1896.

PATRICK B. HAYES.
HUGH M. CARBINE.

In presence of—
ROBERT BURNS,
WM. H. SCOTT.